Patented Oct. 17, 1950

2,525,855

UNITED STATES PATENT OFFICE 2,525,855

HEXAHYDRO PYRIMIDINE DERIVATIVES AND PROCESS OF MAKING SAME

Ernst Bergmann, London, England, assignor to Polymerisable Products Limited, London County, England, a British company No Drawing. Application December 30, 1946, Serial No. 719,337

9 Claims. (Cl. 260—251)

The present invention has reference to new condensation products of the pyrimidine group of the general formula

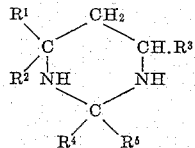

in which $R^1$, $R^2$ and $R^3$ are alkyl or other hydrocarbon groups, and $R^5$ can be hydrogen or an alkyl group, aryl group, hydroxylated alkyl group or cycloalkyl group, plain or halogenated. $R^4$ can be the same. These groups in a particular compound can either be alike or different.

The present invention is concerned more particularly with pyrimidine derivatives of the above formula in which $R^1$ and $R^2$ are both methyl.

The invention also includes new products containing biologically active rings useful for pharmaceutical and other synthetic purposes.

It has been observed that if diamines of the general formula

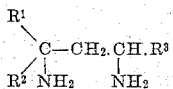

(hereinafter termed "(1.3) diamines") are mixed with aldehydes, a vivid reaction takes place accompanied by a separation of water. In order to complete the reaction one can either add a water-absorbent solid such as calcium chloride, calcium sulphate or magnesium sulphate, which is preferable if one works with aldehydes of a boiling point below 65° C. Alternatively, one adds to the reaction mixture a substance such as benzene or carbon tetrachloride which forms an azeotrope with water, boiling at a temperature below the boiling point of the carbonyl compound used, and subjects the mixture to an azeotropic distillation until the theoretical quantity of water has been removed. Ketones generally react more sluggishly than aldehydes and it is necessary to heat the mixture with the diamine and the azeotrope-forming solvent for several hours before the reaction is complete. If the aldehyde or ketone is one having a boiling point well over 100° C., one can also dispense with the azeotrope-forming solvent and heat the reacting mixture above 100° but below the boiling point of either component so that the water formed can distill off as such.

The products form distillable oils which can be converted into various derivatives as indicated by their chemical structure.

Aliphatic and aromatic aldehydes, aliphatic, hydroaromatic and aromatic ketones as well as hydroxy-ketones can be used. I mention the following carbonyl compounds (in addition to those given in the specific examples):

Propionaldehyde  
Formaldehyde  
Hydrocinnamic aldehyde  
4-chloro-benzaldehyde  
Methyl-propyl-ketone  
Isobutyraldehyde Phenyl-acetaldehyde  
Anisaldehyde  
Acetone  
Cyclopentanone  
Cyclohexyl-methyl-ketone

EXAMPLES (All parts by weight)

Example 1.—2.4-diamino-4-methyl-pentane and cyclohexanone. 23.2 parts of the diamine, 20 parts cyclohexanone and 24 parts benzene were distilled azeotropically for 3 hours during which 3.6 parts of water distill off. The reaction product, 2-(pentamethyleno)-4.6.6-trimethyl-hexahydropyrimidine boiled at 82–83°/5 mm.; yield, 31.5 parts; density, 0.93565; refractive index, 1.4845.

Analysis: Calc. for $C_{12}H_{24}N_2$: C, 73.2; H, 12.2; N, 14.6. Found: C, 73.3; H, 12.7; N, 14.2.

I believe the reaction to be as follows:

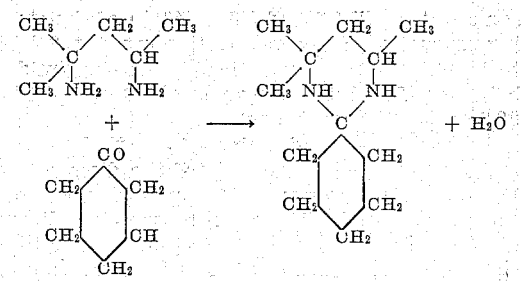

Here $R^4$ and $R^5$ of the first formula, together with the carbon atoms from the CO group, form a portion of a hydroaromatic ring (here a 6-membered ring).

Example 2.—2.4-diamino-4-methyl-pentane and 2-ethyl-hexanal. 30 parts of the diamine and 33 parts of the aldehyde in 40 parts benzene were heated, until the expected quantity of water (5 parts) had distilled azeotropically over. The reaction product, 2-(α-ethyl-pentyl)-4.6.6-trimethyl-hexahydro-pyrimidine, boiled at 105–108°/5 mm.; yield, 53 parts.

In view of the use of 2-ethyl-hexanal, in this example, the term "low alkyl" is used herein to include alkyl groups containing up to 8 carbon atoms.

*Example 3.*—2.4-diamino - 4 - methyl-pentane and benzaldehyde. 23.2 parts of the diamine and 21.2 parts benzaldehyde in 40 parts benzene were heated until 3.6 parts water had distilled off. The reaction product was subjected to distillation under 15 mm. pressure. The desired 2-phenyl-4.6 6-trimethyl-hexahydro-pyrimidine boiled at 155–158°; it was a yellowish, basic-smelling oil. Yield, 33 parts.

*Example 4.*—2.4-diamino - 4 - methyl-pentane and methyl-isobutyl-ketone. In a column, 11.6 parts of the diamine and 10 parts methyl-isobutyl-ketone were boiled in an oil bath at 150° C. so that the temperature at the top of the column never exceeded 110° C. When 1.8 parts water had distilled off, the product was distilled under 50 mm. pressure. B. P. 135°; yield, almost quantitative. The product is 2-isobutyl-2 4.4.6-tetramethyl-hexahydro-pyrimidine, $C_{12}H_{26}N_2$.

*Example 5.*—2.4-diamino - 4 - methyl-pentane and 3-methyl-3-butanol-2-one. 11.8 parts of the diamine, 11.2 parts 3-methyl-3-butanol-2-one and 40 parts benzene were boiled in a column until 1.8 parts water had been liberated and collected in the azeotrope receiver. Distillation of the reaction product gave in quantitative yield a yellow oil, which boiled at 144° under 40 mm. pressure and was the expected 2-(α-hydroxy-isopropyl)-2.4.4.6 - tetramethyl-hexahydro-pyrimidine, formed according to the following equation:

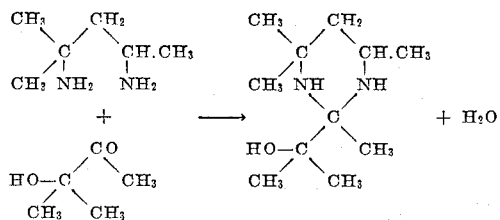

*Example 6.*—2.4-diamino - 4 - methyl-pentane an acetophenone. 23.2 parts of the diamine and 24 parts acetophenone were heated under reflux for 4 hours at 150° C. The product was distilled under 25 mm. pressure and contained apart from some water still 9.3 and 9.6 g. (40%) of the starting materials. The condensation product, 2.4 4.6-tetramethyl - 2 - phenyl - hexahydro - pyrimidine boiled at 155–160°, and was obtained in a yield of 26.2 parts (60% of theory).

*Example 7.*—2.4-diamino - 4 - methyl-pentane and formaldehyde. 14 parts of the diamine and 11 parts of an aqueous 34% formaldehyde solution were mixed. The reaction which indicated itself by the evolution of heat, was brought to completion by addition of anhydrous magnesium sulfate. It appeared to be advantageous to add 10 parts of benzene, to decrease the viscosity of the reaction mixture. Distillation under 50 mm. pressure gave at 80° C. 4.6.6-trimethyl-hexahydro-pyrimidine. Yield, 13 parts. The substance is a yellow liquid, considerably more mobile than the starting material.

The product of Example 3, above, has density 0.973, refractive index 1.5170.

Analysis: Calc. for $C_{13}H_{20}N_2$: C, 76.5; H, 9.8; N, 13.8. Found: C, 76.4; H, 10.1; N, 14.0.

The product of Example 6, above, has density 0.975, refractive index 1.5192.

Analysis: Calc. for $C_{14}H_{22}N_2$; C, 77.1; H, 10.1; N, 12.8. Found: C, 77.3; H, 10.4; 12.4.

Other suitable diamines for use in this process are 3.5-diamino-5-methyl-heptane,

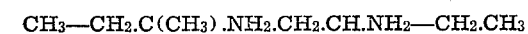

4.6-diamino-6-methyl-nonane

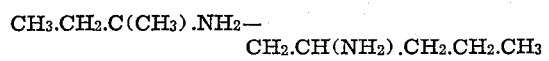

1.3 diamino-1.3-diphenyl-butane

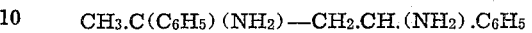

These bodies can be treated similarly to the diamino compound in the above examples.

It will be obvious that when a substituted body, as 4-chloro-benzaldehyde, is used as the aldehyde, the group $R^4$ will be a halogen-substituted monovalent hydrocarbon group (i. e. one containing a halogen element, e. g., chlorine). Similarly a hydroxy-alkyl compound, as in Example 5, can be used.

I wish to point out that in the above formulas,

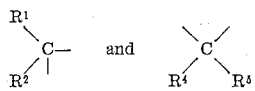

can be hydroaromatic rings, such as cyclopentane or cyclohexane.

I claim:

1. A process which comprises condensing a (1.3) primary amine of the type

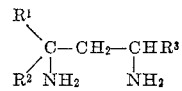

in which $R^1$, $R^2$ and $R^3$ are monovalent hydrocarbon radicals selected from the group consisting of lower alkyl radicals and monocyclic aryl radicals, with a carbonyl-containing compound selected from the group consisting of ketones and aldehydes, by heating a mixture containing said materials sufficiently to distill off water formed in said reaction, whereby there is formed a hexahydro-pyrimidine having the formula

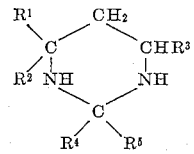

in which $R^1$, $R^2$ and $R^3$ have the meaning stated above and in which $R^4$ and $R^5$ are substituents selected from the group consisting of low alkyl, monocyclic aryl, halogenated-monocyclic aryl, hydroxy-alkyl, cyclohexyl, and hydrogen, and in which $R^4$ and $R^5$ are joined to form a hydroaromatic ring containing 5 to 6 carbon atoms.

2. A process as in claim 1, in which at least one of the groups $R^1$, $R^2$ and $R^3$ is methyl.

3. A process as in claim 1, in which the groups $R^1$ and $R^2$ are methyl groups.

4. A process as in claim 1, in which $R^1$, $R^2$ and $R^3$ are all methyl groups.

5. As a new product, a substance having the general formula

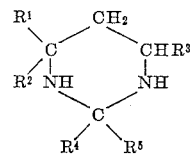

in which $R^1$, $R^2$ and $R^3$ are monovalent hydrocarbon radicals selected from the group consisting of low alkyl and monocyclic aryl, and $R^4$ and $R^5$ are substituents selected from the group consisting of low alkyl, monocyclic aryl, halogenated monocyclic aryl, hydroxy-alkyl, cyclohexyl, and hydrogen, and in which $R^4$ and $R^5$ are joined to form a hydroaromatic ring containing 5 to 6 carbon atoms.

6. A product as in claim 5, in which $R^1$ and $R^2$ are both methyl.

7. 2-(pentamethyleno) - 4.6.6-trimethyl-hexahydro pyrimidine, said body containing two unsubstituted NH groups.

8. 2-isobutyl - 2.4.4.6-tetramethyl-hexahydropyrimidine, said body containing two unsubstituted NH groups.

9. 2-($\alpha$-hydroxy-isopropyl) - 2.4.4.6-tetramethyl-hexahydro-pyrimidine, said body containing two unsubstituted NH groups.

ERNST BERGMANN.

REFERENCES CITED

The following references are of record in the file of this patent:

UNITED STATES PATENTS

| Number | Name | Date |
|---|---|---|
| 1,885,509 | Byers | Nov. 1, 1932 |
| 2,120,547 | Clifford | June 14, 1938 |
| 2,387,043 | Senkus | Oct. 16, 1945 |